UNITED STATES PATENT OFFICE.

CHARLES A. SEELY, OF NEW YORK, N. Y.

IMPROVED MODE OF AMALGAMATING THE PRECIOUS METALS.

Specification forming part of Letters Patent No. 47,577, dated May 2, 1865.

*To all whom it may concern:*

Be it known that I, CHARLES A. SEELY, of the city, county, and State of New York, have invented a new and Improved Device for the Amalgamation of the Precious Metals; and I do hereby declare that the following is a full and exact description thereof.

The nature of my invention consists in the injection of steam or water, or both, under the mercury contained in a suitable amalgamating-vessel, the steam or water being admitted at the bottom of the vessel.

To enable others skilled in the art to make and use my invention, I will proceed to describe its construction and operation.

The amalgamating-vessel should be made of cast-iron, of a nearly cylindrical form, and having a level or slightly concave bottom. This bottom is double, the two disks of which it is composed being separated at a distance of about one-tenth of an inch. The upper one of these disks is perforated with small holes, regularly arranged over its surface, for the admission of the steam or water. The lower disk is provided with a pipe, by which steam or water is led into the vessel as occasion requires. To use the apparatus, mercury is poured into the vessel till it shall have a depth of at least half an inch above the perforated bottom. Upon the mercury is poured a quantity of pulverized ore and water, so as to make the vessel about two-thirds full. The pipe leading from the lower disk of the bottom is now connected with a steam-boiler, and the steam is allowed to flow through it into the mercury, ore, and water for the space of at least thirty minutes. When it is judged that the action of the steam has been long enough continued, the pipe is disconnected from the boiler and connected with a reservoir of water, placed higher than the amalgamating-vessel, in order that it shall flow with considerable force. The water which thus flows up through the vessel and over its top carries with it the earthy matter from which the metal has been extracted, and in a short time the vessel will contain nothing but water and the mercury charged with the precious metals. The operation is now repeated with fresh portions of ore till the mercury has become sufficiently charged with the precious metals to render their removal desirable.

The rationale of the process will be readily apprehended. The use of the steam is twofold—first, to heat the contents of the vessel, by which the affinity of the mercury for the precious metals is greatly increased, and the amalgamating process thereby greatly shortened; second, to produce an agitation of the mercury, water, and ore, by which the particles of metal are brought more promptly in contact with the mercury. The heating and the motion are produced in the most efficient and economical manner, and the amalgamating process is thereby greatly simplified. My invention may be used with advantage generally, but is especially suitable for those processes which make use of the vapor of mercury as a treatment preliminary to amalgamation.

I desire it to be understood that I do not limit myself to the apparatus and process literally as above described, and that there are certain modifications of these which may so easily be made that they are to be regarded as equivalents. For example, instead of the pipe leading into the lower disk, it may be connected with the upper or perforated disk of the double bottom; also, instead of a double bottom, the amalgamating-vessel may have a single bottom, and the steam and water be injected through a rose placed closely upon the single bottom. Instead of a cylindrical form, the vessel may have inclined sides, &c. One of the essential features of my invention is the introduction of the steam or water at the under surface of the mercury, in order to keep the whole mass in motion.

What I claim, and desire to secure by Letters Patent, is—

The injection of steam or water, or both, at the bottom of the mercury in an amalgamating-vessel, substantially as described.

CHARLES A. SEELY.

Witnesses:
W. R. JANES,
T. P. SEELY.